(12) United States Patent
Ellenrieder et al.

(10) Patent No.: US 8,460,459 B2
(45) Date of Patent: Jun. 11, 2013

(54) INORGANIC BINDER SYSTEM FOR THE PRODUCTION OF CHEMICALLY RESISTANT CONSTRUCTION CHEMISTRY PRODUCTS

(75) Inventors: Florian Ellenrieder, Augsburg (DE); Uwe Gehrig, St. Georgen (DE); Mathias Degenkolb, Neustadt (DE); Joachim Riedmiller, Friedberg (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 13/510,979

(22) PCT Filed: Sep. 13, 2010

(86) PCT No.: PCT/EP2010/063386
§ 371 (c)(1), (2), (4) Date: Jun. 19, 2012

(87) PCT Pub. No.: WO2011/064005
PCT Pub. Date: Jun. 3, 2011

(65) Prior Publication Data
US 2012/0247369 A1     Oct. 4, 2012

(30) Foreign Application Priority Data

Nov. 26, 2009  (EP) .................................... 09177153

(51) Int. Cl.
| | | |
|---|---|---|
| *C04B 14/04* | (2006.01) | |
| *C04B 14/22* | (2006.01) | |
| *C04B 18/04* | (2006.01) | |
| *C04B 18/06* | (2006.01) | |
| *C04B 18/14* | (2006.01) | |
| *C04B 28/08* | (2006.01) | |
| *C04B 28/26* | (2006.01) | |

(52) U.S. Cl.
USPC ........... 106/790; 106/624; 106/705; 106/707; 106/789

(58) Field of Classification Search
USPC .................... 106/705, 789, 790, 624, 707
See application file for complete search history.

(56) References Cited

U.S. PATENT DOCUMENTS

| | | | |
|---|---|---|---|
| 4,349,386 A | 9/1982 | Davidovits | |
| 4,472,199 A | 9/1984 | Davidovits | |
| 4,509,985 A | 4/1985 | Davidovits et al. | |
| 4,642,137 A * | 2/1987 | Heitzmann et al. | 106/607 |
| 8,202,362 B2 | 6/2012 | Davidovits et al. | |
| 2008/0145610 A1* | 6/2008 | Muller et al. | 428/142 |
| 2010/0010139 A1 | 1/2010 | Davidovits et al. | |
| 2011/0306255 A1 | 12/2011 | Rathenow | |

FOREIGN PATENT DOCUMENTS

| | | |
|---|---|---|
| DE | 10 2008 033 447 B3 | 11/2009 |
| EP | 0 457 516 A1 | 11/1991 |
| EP | 1 081 114 A1 | 3/2001 |
| EP | 1 236 702 A1 | 9/2002 |
| JP | 54-063298 A * | 5/1979 |
| WO | WO 85/03699 A1 | 8/1985 |
| WO | 2006/024452 A1 * | 3/2006 |
| WO | WO 2008/012438 A2 | 1/2008 |
| WO | WO 2009/121888 A1 | 10/2009 |

OTHER PUBLICATIONS

PCT/EP2010/063386—International Search Report, Dec. 21, 2010.
PCT/EP2010/063386—International Written Opinion, Dec. 21, 2010.
PCT/EP2010/063386—International Preliminary Report on Patentability, Jun. 30, 2011.

* cited by examiner

*Primary Examiner* — Anthony J Green
(74) *Attorney, Agent, or Firm* — Curatolo Sidoti Co., LPA; Joseph G. Curatolo; Salvatore A. Sidoti

(57) ABSTRACT

A novel binder system comprising at least one latent hydraulic binder, at least one amorphous silica, optionally at least one reactive filler and at least one alkali metal silicate is proposed.

It was surprisingly found that the binder system according to the invention hardens in the form of a hybrid matrix which is acid-resistant, water-resistant and alkali-resistant.

The binder system can be used for the production of a hydraulically setting mortar which, after setting, hardening for seven days and subsequent storage for three days in acid, base and/or water, has compressive strengths of more than 15 N mm$^{-2}$, preferably more than 20 N mm$^{-2}$ and in particular more than 25 N mm$^{-2}$, according to DIN EN 13888.

14 Claims, No Drawings

INORGANIC BINDER SYSTEM FOR THE PRODUCTION OF CHEMICALLY RESISTANT CONSTRUCTION CHEMISTRY PRODUCTS

The present invention relates to a novel inorganic binder system, the use of this binder system for the production of a hydraulically setting mortar and a mortar which contains this binder system.

Portland cement was first mentioned in British patent BP 5022 and has since been continuously further developed. Modern Portland cement contains about 70% by weight of CaO+MgO, about 20% by weight of $SiO_2$ and about 10% by weight of $Al_2O_3+Fe_2O_3$. Owing to its high CaO content, it hardens hydraulically. Hardened Portland cement is alkali-resistant but not acid-resistant.

As latent hydraulic binders, certain slags from metallurgical processes can be activated with strong alkalis, such as, for example, waterglasses or can be used as admixtures to Portland cement. By mixing with fillers (quartz sand or aggregate having a corresponding grain size) and additives, they can be used as mortars or concretes. Blast furnace slag, a typical latent hydraulic binder, has as a rule 30 to 45% by weight of CaO, about 4 to 17% by weight of MgO, about 30 to 45% by weight of $SiO_2$ and about 5 to 15% by weight of $Al_2O_3$, typically about 40% by weight of CaO, about 10% by weight of MgO, about 35% by weight of $SiO_2$ and about 12% by weight of $Al_2O_3$. Hardened products generally have the properties of hydraulically hardened systems.

Inorganic binder systems based on reactive water-insoluble oxides based on $SiO_2$ in combination with $Al_2O_3$, which harden in an aqueous alkaline medium, are generally known. Such binder systems are also referred to as geopolymers and are described, for example, in U.S. Pat. No. 4,349,386, WO 85/03699 and U.S. Pat. No. 4,472,199. Such systems have as a rule 50 to 60% by weight of $SiO_2$, 20 to 25% by weight of $Al_2O_3$, no CaO and 15 to 30% by weight of $M_2O$ (M=Na, K).

Metakaolin, slag, fly ash, activated clay or mixtures thereof may be used as reactive oxide mixture. The alkaline medium for activating the binder usually consists of aqueous solutions of alkali metal carbonates, alkali metal fluorides, alkali metal hydroxides and/or soluble waterglass. The hardened binders have high mechanical stability. In comparison with cement, they may be more economical and more resistant and may have a more advantageous CO2 emission balance. Such systems are as a rule more likely to be acid-resistant and less likely to be alkali-resistant.

WO 08/012438 describes a further geopolymer cement based on low-CaO fly ash class F, blast furnace slag and aqueous alkali metal silicate having an $SiO_2:M_2O$ ratio of more than 1.28, preferably of more than 1.45. In the examples calculated on the basis of anhydrous oxides, about 45 to 50% by weight of $SiO_2$, about 20 to 26% by weight of $Al_2O_3$, about 9 to 10% by weight of CaO and about 3 to 4% by weight of $K_2O$ are present.

The inventors have set themselves the object of substantially avoiding at least some of the disadvantages of the prior art discussed above. In particular, it was the object of the invention to provide an inorganic binder system which, in the hardened state, has high mechanical strength and is water-resistant, acid-resistant and alkali-resistant. In particular, the hardened system should have these properties even at a relatively early stage, in particular after only 7 days, and should harden even at room temperature, preferably at as low as 10° C.

EP 1236702 describes a waterglass-containing construction material mixture for the production of mortars resistant to chemicals and based on a latent hydraulic binder, waterglass and a metal salt as a control agent. Slag sand, too, can be used as a latent hydraulic component. Alkali metal salts, in particular lithium salts, are mentioned and used as the metal salt.

EP 1081114 describes a construction material mixture for the production of mortars resistant to chemicals, the construction material mixture containing waterglass powder and at least one waterglass hardener. Furthermore, more than 10% by weight of at least one latent hydraulic binder are present, and the construction material mixture has at least one inorganic filler.

In EP 0457516, fireproof, water-tight, acid-resistant binders comprising alkali metal silicates, metal oxides and metal carbonates and optionally, inter alia, microsilica are described. In these systems the metal oxides are used as setting accelerators.

The abovementioned object is achieved by the features of the independent claims. The dependent claims relate to preferred embodiments.

It was surprisingly found that the inorganic binder system according to the invention hardens in the form of a hybrid matrix which is acid-resistant, water-resistant and alkali-resistant.

The present invention provides an inorganic binder system which comprises at least one latent hydraulic binder, at least one amorphous silica, optionally at least one reactive filler and at least one alkali metal silicate.

The inorganic binder system of the invention preferably comprises 10 to 30 parts by weight of latent hydraulic binder, 5 to 22 parts by weight of amorphous silica, 0 to 15 parts by weight of reactive filler and 3 to 20 parts by weight of alkali metal silicate.

More preferably, it comprises 10 to 30 parts by weight of latent hydraulic binder, 5 to 20 parts by weight of amorphous silica, 0 to 15 parts by weight of reactive filler and 3 to 20 parts by weight of alkali metal silicate.

Particularly preferably, it comprises 15 to 25 parts by weight of the latent hydraulic binder, 5 to 17 parts by weight of amorphous silica, 0 to 10 parts by weight of the reactive filler and 4 to 15 parts by weight of alkali metal silicate.

In the context of the present invention, a latent hydraulic binder is preferably to be understood as meaning a binder in which the molar $(CaO+MgO):SiO_2$ ratio is between 0.8 and 2.5 and particularly preferably between 1.0 and 2.0. In particular, the latent hydraulic binder is selected from blast furnace slag, slag sand, ground slag, electrothermal phosphorus slag and steel slag.

Blast furnace slag is a waste product of the blast furnace process. Slag sand is granulated blast furnace slag and ground slag is finely pulverized blast furnace slag. The ground slag varies in its fineness of grinding and particle size distribution according to origin and preparation form, the fineness of grinding having an influence on the reactivity. The so-called Blaine value, which is typically of the order of magnitude of 200 to 1000, preferably between 300 and 500 $m^2\,kg^{-1}$, is used as a characteristic for the fineness of milling. A typical composition of blast furnace slag was mentioned hereinabove.

Electrothermal phosphorus slag is a waste product of electrothermal phosphorus production. It is less reactive than blast furnace slag and contains about 45 to 50% by weight of CaO, about 0.5 to 3% by weight of MgO, about 38 to 43% by weight of $SiO_2$, about 2 to 5% by weight of $Al_2O_3$ and about 0.2 to 3% by weight of $Fe_2O_3$ as well as fluoride and phosphate. Steel slag is a waste product of various steel production processes with strongly varying composition (cf. Caijun Shi, Pavel V. Krivenko, Della Roy, Alkali-Activated Cements and Concretes, Taylor & Francis, London & New York, 2006, pages 42-51).

The amorphous silica is preferably an X-ray-amorphous silica, i.e. a silica which shows no crystallinity in the powder diffraction method. In particular, it is selected from precipitated silica, pyrogenic silica and microsilica as well as glass powder, which is likewise to be considered as amorphous silica in the context of the present invention.

The amorphous silica according to the invention suitably has a content of at least 80% by weight, preferably at least 90% by weight, of $SiO_2$. Precipitated silica is obtained industrially via precipitation processes starting from waterglass. Precipitated silica is also referred to as silica gel, depending on the production process. Pyrogenic silica is produced by reacting chlorosilanes, such as, for example, silicon tetrachloride, in an oxyhydrogen flame. Pyrogenic silica is an amorphous $SiO_2$ powder having a particle diameter of 5 to 50 nm and a specific surface area of 50 to 600 $m^2 g^{-1}$.

Microsilica (also referred to as silica fume) is a by-product of silicon or ferrosilicon production and likewise comprises for the most part amorphous $SiO_2$ powder. The particles have diameters of the order of magnitude of 0.1 μm. The specific surface area is of the order of magnitude of 20 to 25 $m^2 g^{-1}$ (cf. Caijun Shi, Pavel V. Krivenko, Della Roy, Alkali-Activated Cements and Concretes, Taylor & Francis, London & New York, 2006, pages 60-61). In contrast, commercially available quartz sand is crystalline, has comparatively large particles and a comparatively small specific surface area. It serves according to the invention merely as an inert aggregate.

The reactive filler is an optional component. It is suitably a substance having pozzolanic activity. The test for pozzolanic activity can be effected according to DIN EN 196 part 5. An overview of pozzolans suitable according to the invention is to be found in Caijun Shi, Pavel V. Krivenko, Della Roy, Alkali-Activated Cements and Concretes, Taylor & Francis, London & New York, 2006, pages 51-60, and pages 61-63. Preferably, the reactive filler is selected from brown coal fly ash, mineral coal fly ash, metakaolin, volcanic ash, tuff, trass, pozzolana and zeolites. Metakaolin and fly ashes of Classes C (brown coal fly ash) and F (mineral coal fly ash) are particularly preferred.

Metakaolin forms in the dehydration of kaolin. While kaolin releases physically bound water at 100 to 200° C., a dehydroxylation takes place at 500 to 800° C. with a collapse of the lattice structure and formation of metakaolin ($Al_2Si_2O_7$). Pure metakaolin accordingly contains about 54% by weight of $SiO_2$ and about 46% by weight of $Al_2O_3$. Fly ashes form, inter alia, in the combustion of coal in power stations. According to WO 08/012438, fly ash of class C contains about 10% by weight of CaO while fly ashes of class F contain less than 8% by weight, preferably less than 4% by weight and typically about 2% by weight of CaO. The teaching of WO 08/012438 is hereby incorporated by reference to this extent.

On establishing a suitable hybrid matrix, in particular the choice of the raw materials and the proportions by weight thereof are of importance. With a suitable choice, the inorganic binder system according to the invention has, as a rule the, following oxide composition, calculated on the basis of the solids:

30 to 70% by weight of $SiO_2$,
2 to 30% by weight of $Al_2O_3$,
5 to 30% by weight of CaO, and
5 to 30% by weight of $M_2O$,
preferably:

30 to 65%, particularly preferably 45 to 60%, by weight of $SiO_2$,
5 to 30%, particularly preferably 5 to 15%, by weight of $Al_2O_3$,
5 to 30%, particularly preferably 12 to 28%, by weight of CaO, and
5 to 30%, particularly preferably 5 to 20%, by weight of $M_2O$.

The best results are obtained with 12 to 25% by weight of CaO.

The amount of water required for setting is suitably 10 to 50 parts by weight, preferably 20 to 40 parts by weight, based on the total weight of the (anhydrous) inorganic binder system. The amount of water required for setting is thus not counted as a constituent of the inorganic binder system.

The alkali metal silicate is selected from compounds having the empirical formula $m\ SiO_2 \cdot n\ M_2O$, in which M represents Li, Na, K or $NH_4$, or a mixture thereof, preferably Na or K.

The molar ratio of m:n is suitably not more than 3.6, preferably not more than 3.0, and in particular not more than 2.0. Even more preferably it is not more than 1.70 and in particular not more than 1.20.

The alkali metal silicate is preferably a waterglass, particularly preferably a liquid water glass and in particular a sodium or potassium waterglass. However, lithium or ammonium waterglasses and mixtures of said waterglasses may also be used. In the case of liquid waterglasses, the abovementioned parts by weight are calculated on the basis of the solids contents of these waterglasses, which as a rule are 20% by weight to 60% by weight, preferably 30 to 50% by weight, of solids.

The abovementioned m:n ratios (also referred to as modulus) should preferably not be exceeded, since otherwise complete activation of the components can no longer be expected. Considerably lower moduli, such as, for example, about 0.2, may also be used. Waterglasses having higher moduli should be adjusted before use with a suitable aqueous alkali metal hydroxide. Potassium waterglasses are commercially available mostly as aqueous solutions in the suitable modulus range, since they are strongly hygroscopic; sodium waterglasses are also commercially available as solids in the suitable modulus range.

If the alkali metal silicate or the waterglass is solid, the inorganic binder system can expediently be formulated as a one-component system, which can then be caused to harden by the addition of water. In this case, the latent hydraulic binder, the amorphous silica, the optional reactive filler and the alkali metal silicate are present together as one component.

However, the waterglass can also be used in the form of an aqueous solution. In this case, the inorganic binder system is expediently formulated as a two-component system, wherein usually the latent hydraulic binder, the amorphous silica and the optional reactive filler are present as a first component and the waterglass solution, which contains at least the amount of water required for setting, is present as a second component. At least in the case of potassium waterglass, this embodiment is preferred.

Inert fillers and/or further additives may additionally be present in the inorganic binder system according to the invention. These optional components can alternatively also be added only on preparation of a mortar or concrete.

Preferably, between 0 and 80% by weight, particularly preferably between 30 and 70% by weight, of inert fillers and/or between 0 and 15% by weight of additives may be present or may be added during the mortar or concrete preparation. These weight data are based on the total weight of the solids of the (anhydrous) inorganic binder system. The inert fillers and/or further additives are thus not counted as constituents of the inorganic binder system.

Generally known gravels, sands and/or powders, for example based on quartz, limestone, barite or clay, in particular quartz sand, are suitable as inert fillers. Light fillers, such as perlite, kieselguhr (diatomaceous earth), exfoliated mica (vermiculite) and foamed sand, can also be used.

Suitable additives are, for example, generally known flow agents, antifoams, water retention agents, plasticizers, pigments, fibers, dispersion powders, wetting agents, retardants, accelerators, complexing agents, aqueous dispersions and rheology modifiers.

Cement may also be present or may be added during the mortar or concrete preparation as a further (hydraulic) additive. A proportion of not more than 20%, preferably not more than 10%, by weight of cement, based on the total weight of the solids of the (anhydrous) inorganic binder system, is preferred. This cement can preferably be Portland cement and/or high-alumina cement.

The present invention furthermore provides for the use of the inorganic binder system of the invention as or as a constituent of building material formulations and/or building products such as concrete, finished concrete parts, concrete goods, concrete blocks and also on-site concrete, spray concrete, ready-mixed concrete, building adhesives and thermal insulation composite system adhesives, concrete repair systems, one-component and two-component sealing slurries, screeds, knifing fillers and self-levelling compositions, tile adhesives, plasters and renders, adhesives and sealants, coating systems, in particular for tunnels, wastewater channels, spray protection and condensate lines, dry mortars, joint grouts, drainage mortars and/or repair mortars.

For this purpose, the inorganic binder system of the invention is often mixed with further components, such as fillers, hydraulic substances and additives. The addition of the alkali metal silicate in powder form is preferably effected before said components are mixed with water. Alternatively, an aqueous alkali metal silicate solution can be added to the other powder components.

The present invention furthermore provides a mortar, in particular a dry mortar or joint grout, which contains the inorganic binder system of the invention.

After setting, hardening for seven days and subsequent storage for three days in acid, base and/or water, this mortar has compressive strengths of more than 15 N mm$^{-2}$, preferably more than 20 N mm$^{-2}$ and in particular more than 25 N mm$^{-2}$, as determined according to DIN EN 13888.

The present invention is now illustrated in more detail with reference to the following examples:

EXAMPLES

Raw Materials

Metakaolin comprising about 56% by weight of $SiO_2$, 41% by weight of $Al_2O_3$ and in each case <1% by weight of CaO and alkali metal oxide; BET surface area >10 000 m$^2$ kg$^{-1}$;

Microsilica comprising >90% by weight of $SiO_2$ and in each case <1% by weight of $Al_2O_3$, CaO and alkali metal oxide; BET surface area >15 000 m$^2$ kg$^{-1}$;

Ground blast furnace slag comprising about 34% by weight of $SiO_2$, 12% by weight of $Al_2O_3$, 43% by weight of CaO and <1% by weight of alkali metal oxide; Blaine value >380 m$^2$ kg$^{-1}$;

Aqueous potassium waterglass having a molar $SiO_2$:$K_2O$ ratio of 1.5 or 1.0 and solids contents of 50% by weight or 40% by weight, respectively;

Commercially available quartz sand.

Comparative Examples M1, M2 and M3, and Working Examples M4 and M5

Suitably, at first all powdery substances are homogenized and then mixed with the liquid component. All examples are two-component systems, since the aqueous potassium waterglass is added separately in each case. Cylindrical test specimens having a diameter of 25±1 mm and a height of 25±1 mm are produced. The test specimens are tested for chemical resistance according to DIN EN 13888, i.e. after preliminary storage for 7 days under standard climatic conditions, the test specimens are stored in a test medium. For the classification of the mixtures, the compressive strength is determined both before and after the storage. The experimental formulations are stated in Table 1 in parts by weight. The oxide compositions of the anhydrous binder systems are stated in Table 2 in % by weight. Table 3 shows the compressive strengths of the test specimens before and after storage in the test media; standard climatic conditions is understood as meaning 23° C. and 50% relative humidity.

TABLE 1

| Raw Materials | M1 | M2 | M3 | M4 | M5 |
|---|---|---|---|---|---|
| Metakaolin | 100 | | | | 20 |
| Microsilica | | | 210 | 110 | 100 |
| Ground blast furnace slag | | 300 | 90 | 190 | 180 |
| Potassium waterglass (50% solids, mod. 1.5) | 300 | | | | |
| Potassium waterglass (40% solids, mod. 1.0) | | 200 | 200 | 200 | 200 |
| Quartz sand | 700 | 700 | 700 | 700 | 700 |

TABLE 2

| Oxides | M1 | M2 | M3 | M4 | M5 |
|---|---|---|---|---|---|
| $SiO_2$ | 52 | 36 | 71 | 54 | 54 |
| $Al_2O_3$ | 16 | 9 | 3 | 6 | 8 |
| CaO | <1 | 34 | 10 | 22 | 21 |
| $M_2O$ | 31 | 14 | 14 | 14 | 14 |

TABLE 3

| Compressive strength/ N mm$^{-2}$ | M1 | M2 | M3 | M4 | M5 |
|---|---|---|---|---|---|
| 7 d standard climatic conditions | >7 | >30 | >30 | >30 | >30 |
| 7 d standard climatic conditions and 3 d in 10% HCl | <2 | <10 | >30 | >30 | >30 |
| 7 d standard climatic conditions and 3 d in 10% NaOH | <2 | >30 | <2 | >30 | >30 |
| 7 d standard climatic conditions and 3 d in $H_2O$ | <7 | >30 | >30 | >30 | >30 |

Table 3 shows that, after a short duration of hardening of seven days under standard climatic conditions, the minimum compressive strengths of 15 N mm$^{-2}$ required according to DIN EN 13888 are achieved by M2 through M5. Whereas, however, the reference systems M1 through M3 after acid, water and/or alkali treatment have low compressive strength, very high compressive strengths can be determined in the case of the systems M4 and M5 according to the invention, even after storage in the various test media. The systems according to the invention are accordingly acid-, water- and alkali-resistant.

The invention claimed is:

1. An inorganic binder system comprising:
   10 to 30 parts by weight of at least one latent hydraulic binder selected from blast furnace slag, slag sand, ground slag, electrothermal phosphorous slag, and steel slag;
   5 to 22 parts by weight of at least one amorphous silica selected from precipitated silica, pyrogenic silica, microsilica, and glass powder;
   0 to 15 parts by weight of at least one reactive filler selected from brown coal fly ash, mineral coal fly ash, metakaolin, volcanic ash, tuff, trass, pozzolana, and zeolites;
   3 to 20 parts by weight of at least one silicate selected from compounds having the empirical formula $mSiO_2 \cdot nM_2O$, in which M represents Li, Na, K or $NH_4$, or a mixture thereof, wherein the molar ratio of m:n is $\leq 3.6$;
   wherein the binder system comprises 12 to 25% by weight of CaO;
   wherein 10 to 50 parts by weight of water are required for setting; and
   wherein the latent hydraulic binder, the amorphous silica, and the optional reactive filler are present as a first component and the silicate together with at least an amount of water required for setting are present as a second component.

2. The binder system according to claim 1, comprising
   15 to 25 parts by weight of latent hydraulic binder,
   5 to 17 parts by weight of amorphous silica,
   0 to 10 parts by weight of reactive filler, and
   4 to 15 parts by weight of silicate.

3. The binder system according to claim 1, comprising the following oxide composition:
   30 to 70% by weight of $SiO_2$,
   2 to 30% by weight of $Al_2O_3$,
   12 to 25% by weight of CaO, and
   5 to 30% by weight of $M_2O$.

4. The binder system according to claim 1, comprising the following oxide composition:
   45 to 60% by weight of $SiO_2$,
   5 to 15% by weight of $Al_2O_3$,
   12 to 25% by weight of CaO, and
   5 to 20% by weight of $M_2O$.

5. The binder system according to claim 1, wherein the molar ratio of m:n is $\leq 1.70$.

6. The binder system according to claim 1, wherein inert fillers and/or further additives are additionally present.

7. The binder system according to claim 1, wherein $\leq 20\%$ by weight of cement is present.

8. The binder system according to claim 1, wherein the M comprises Na or K.

9. The binder system according to claim 1, wherein the molar ratio of m:n is $\leq 3.0$.

10. The binder system according to claim 1, wherein the molar ratio of m:n is $\leq 2.0$.

11. The binder system according to claim 1, wherein the molar ratio of m:n is $\leq 1.20$.

12. The binder system according to claim 1, wherein 20 to 40 parts by weight of water are required for setting.

13. A mortar, a dry mortar or joint grout, which contains the binder system according to the definition of claim 1.

14. The mortar according to claim 13, wherein, after setting, hardening for seven days and subsequent storage for three days in acid, base and/or water, the mortar has compressive strengths of more than 15 N $mm^{-2}$, as determined according to DIN EN 13888.

* * * * *